US010811914B2

(12) United States Patent
Idogaki

(10) Patent No.: US 10,811,914 B2
(45) Date of Patent: Oct. 20, 2020

(54) WIRELESS POWER SUPPLY MANAGEMENT APPARATUS, WIRELESS POWER SUPPLY MANAGEMENT METHOD, AND PROGRAM

(71) Applicant: DAIHEN Corporation, Osaka-shi, Osaka (JP)

(72) Inventor: Takumi Idogaki, Osaka (JP)

(73) Assignee: DAIHEN Corporation, Osaka-shi (JP)

( * ) Notice: Subject to any disclaimer, the term of this patent is extended or adjusted under 35 U.S.C. 154(b) by 310 days.

(21) Appl. No.: 15/908,207

(22) Filed: Feb. 28, 2018

(65) Prior Publication Data

US 2018/0262066 A1 Sep. 13, 2018

(30) Foreign Application Priority Data

Mar. 9, 2017 (JP) ................................. 2017-044789

(51) Int. Cl.
*H02J 7/00* (2006.01)
*H02J 50/90* (2016.01)
(Continued)

(52) U.S. Cl.
CPC .......... *H02J 50/90* (2016.02); *H02J 7/00036* (2020.01); *H02J 7/00038* (2020.01); *H02J 7/025* (2013.01);
(Continued)

(58) Field of Classification Search
CPC .. H02J 7/025; H02J 50/90; H02J 50/80; H02J 50/10; H02J 7/00038; H02J 7/00036;
(Continued)

(56) References Cited

U.S. PATENT DOCUMENTS

2004/0263119 A1* 12/2004 Meyer ................... H02J 7/0022
320/116
2007/0280720 A1* 12/2007 Kimura .................. G03G 15/80
399/88
(Continued)

FOREIGN PATENT DOCUMENTS

EP 2940649 A1 11/2015
EP 3018795 A1 5/2016
(Continued)

OTHER PUBLICATIONS

European Office Action issued for Patent Application No. 18158494.7 dated Nov. 16, 2018.
(Continued)

*Primary Examiner* — Arun C Williams
(74) *Attorney, Agent, or Firm* — Troutman Pepper Hamilton Sanders LLP

(57) ABSTRACT

In order to solve a problem that it is not possible to properly detect and output charge insufficiency of a power storage device in a case where it is not charged to a fully charged state, a wireless power supply management apparatus used for a wireless power supply system configured to repeatedly charge and discharge a power storage device includes a detecting portion that acquires, for one or more charge periods, information regarding insufficiency of electric power charged in each charge period, and detects charge insufficiency of the power storage device using the acquired information; and an output portion that performs output according to a result of the detection by the detecting portion. Accordingly, it is possible to properly detect charge insufficiency of a power storage device.

6 Claims, 6 Drawing Sheets

(51) Int. Cl.
    *H02J 50/80*    (2016.01)
    *H02J 7/02*     (2016.01)
    *H02J 50/10*    (2016.01)
    *H02J 50/12*    (2016.01)

(52) U.S. Cl.
    CPC .............. *H02J 50/10* (2016.02); *H02J 50/80*
        (2016.02); *H02J 50/12* (2016.02); *H02J*
        *2007/0067* (2013.01)

(58) Field of Classification Search
    CPC ... H02J 50/12; H02J 2007/0067; H01F 38/14;
        Y02T 90/122; B60L 11/182; Y02E 60/12
    See application file for complete search history.

(56) References Cited

U.S. PATENT DOCUMENTS

| | | | |
|---|---|---|---|
| 2008/0197804 A1* | 8/2008 | Onishi | .................... H02J 7/025 320/108 |
| 2009/0315393 A1* | 12/2009 | Yeh | .......................... B60L 1/00 307/10.1 |
| 2013/0154386 A1 | 6/2013 | Bae | |
| 2015/0171641 A1* | 6/2015 | Sato | ........................ H02J 7/007 320/107 |
| 2015/0327839 A1 | 11/2015 | Kim et al. | |
| 2016/0141919 A1 | 5/2016 | Ohashi et al. | |
| 2018/0239408 A1* | 8/2018 | Kuchibhatla | ......... G06F 13/385 |

FOREIGN PATENT DOCUMENTS

| | | |
|---|---|---|
| JP | 2010-183810 A | 8/2010 |
| JP | 2011-83165 A | 4/2011 |
| JP | 2013-103548 A | 5/2013 |
| JP | 2015-3610 A | 1/2015 |
| WO | 20140038167 A1 | 3/2014 |
| WO | 2015122127 A1 | 8/2015 |

OTHER PUBLICATIONS

Extended European search report issued in European Patent Application 18158494.7, dated Apr. 23, 2018.

Notice of Reasons for Refusal issued in corresponding Japanese Patent Application No. 2017-044789 dated Aug. 25, 2020, with machine translation.

* cited by examiner

| Time | Current | Voltage |
|---|---|---|
| $t_1$ | $x_1$ | $y_1$ |
| $t_2$ | $x_2$ | $y_2$ |
| $t_3$ | $x_3$ | $y_3$ |
| $t_4$ | $x_4$ | $y_4$ |
| $t_5$ | $x_5$ | $y_5$ |
| $t_6$ | $x_6$ | $y_6$ |
| ⋮ | ⋮ | ⋮ |

FIG.4

| Time | Current | Voltage |
|---|---|---|
| $t_{101}$ | $x_{101}$ | $y_{101}$ |
| $t_{102}$ | $x_{102}$ | $y_{102}$ |
| $t_{103}$ | $x_{103}$ | $y_{103}$ |
| $t_{104}$ | $x_{104}$ | $y_{104}$ |
| $t_{105}$ | $x_{105}$ | $y_{105}$ |
| $t_{106}$ | $x_{106}$ | $y_{106}$ |
| ⋮ | ⋮ | ⋮ |

FIG.5

WIRELESS POWER SUPPLY MANAGEMENT APPARATUS, WIRELESS POWER SUPPLY MANAGEMENT METHOD, AND PROGRAM

CROSS REFERENCE TO RELATED APPLICATION

This application claims the benefit of Japanese Patent Application No. JP 2017-044789 filed on Mar. 9, 2017, the entire contents of which being hereby incorporated by reference.

FIELD OF THE INVENTION

The present invention relates to a wireless power supply system and the like for performing wireless power supply.

DESCRIPTION OF RELATED ART

As a conventional technique, a non-contact power transmitter is known in which a detecting unit that detects a charged state of a secondary battery is provided on the power receiving side, and the charge is ended in response to a full charge signal from the power receiving side (see JP 2010-183810A (p. 1, FIG. 1, etc.), for example).

For example, in a case where, on plant lines or the like, specific one or more tasks are repeatedly performed using an apparatus or the like including a power storage device, power supply is performed by a wireless power supply system for a predetermined period of time each time the specific one or more tasks are performed, so that the power storage device can be charged with electric power in an amount that matches the amount of electric power that has been already consumed or that is to be used next, and the specific one or more tasks can be successively and repeatedly performed.

However, in the case of performing wireless power supply, if the positional relationship between a primary coil on the power supply side and a secondary coil on the power receiving side is shifted, the amount of electric power that can be supplied and the efficiency of power supply change, and thus, even when charge is performed for a predetermined period of time, charge of electric power that is to be used next or electric power consumed immediately before may not be sufficiently performed.

Furthermore, if the load that is incurred on an apparatus or the like including a power storage device is different for each specific task, the electric power that is to be consumed is different for each task, and thus, even when charge is performed for a predetermined period of time, charge of electric power that is to be used next or electric power consumed immediately before may not be sufficiently performed.

Furthermore, if the length of the time in which a task is performed or one charge period varies, even when charge is performed for a predetermined period of time, charge of electric power that is to be used next or electric power consumed immediately before may not be sufficiently performed.

If such a state in which charge of the power storage device is insufficient successively occurs in the charge periods, the amount of electric power charged in the power storage device gradually decreases, and the necessary electric power cannot be supplied, and, finally, the electric power runs out. As a result, an apparatus including the power storage device may stop during a task. Accordingly, it is required to detect such charge insufficiency in each charge period, and give notice thereof.

However, in the case of performing charge so as to compensate for electric power that is to be used next or electric power consumed in one or more tasks immediately before or the like as described above, it is not absolutely necessary to fully charge the power storage device, and thus whether or not the power storage device is charged with electric power that is to be used next or electric power consumed in a task immediately before cannot be determined in each charge period merely by determining, as in conventional examples, whether or not the charged state is a fully charged state, and charge insufficiency of a power storage device cannot be properly detected.

SUMMARY OF THE INVENTION

The present invention was arrived at in order to solve the above-described problems, and it is an object thereof to provide a wireless power supply management apparatus that can properly detect and output charge insufficiency of a power storage device.

The present invention is directed to a wireless power supply management apparatus used for a wireless power supply system including a power storage device, and configured to repeatedly charge and discharge the power storage device, including: a detecting portion that acquires, for one or more charge periods, information regarding insufficiency of electric power charged in each charge period, and detects charge insufficiency of the power storage device using the acquired information; and an output portion that performs output according to a result of the detection by the detecting portion.

With this configuration, it is possible to properly detect and output charge insufficiency of a power storage device, using information regarding insufficiency of electric power charged in each charge period.

Furthermore, the wireless power supply management apparatus of the present invention further includes: an acquiring portion that acquires, for each of one or more charge-discharge periods, each of which is a pair of a charge period and a discharge period immediately before or immediately after the charge period, charge information indicating electric power wirelessly charged to the power storage device in a charge period and discharge information indicating electric power discharged from the power storage device in a discharge period, wherein the detecting portion acquires information regarding insufficiency of electric power charged in each charge period of the one or more charge-discharge periods, using the charge information and the discharge information acquired by the acquiring portion for each of the one or more charge-discharge periods.

With this configuration, it is possible to properly detect and output charge insufficiency of a power storage device, using electric power charged and electric power discharged in one or more charge-discharge periods.

Furthermore, the wireless power supply management apparatus of the present invention is such that the charge information indicates charged electric power that is electric power charged in a charge period, and the discharge information indicates discharged electric power that is electric power discharged in a discharge period.

With this configuration, it is possible to properly detect and output charge insufficiency of a power storage device, using charged electric power and discharged electric power.

Furthermore, the wireless power supply management apparatus of the present invention further includes: a charge amount acquiring portion that acquires, for each of one or more charge periods, one or more pieces of charge amount information indicating electric power charged to the power storage device, wherein the detecting portion acquires information regarding insufficiency of electric power charged in each of the one or more charge periods, using the one or more pieces of charge amount information acquired by the charge amount acquiring portion.

With this configuration, it is possible to easily acquire information regarding insufficiency of electric power in each charge period, using the charge amount information, and to easily detect charge insufficiency of a power storage device.

Furthermore, the wireless power supply management apparatus of the present invention is such that the detecting portion determines, for each of two or more charge-discharge periods, whether or not electric power discharged in a discharge period is larger than electric power charged in a charge period, acquires information indicating a result of the determination, as information regarding insufficiency of electric power charged in the charge period, detects a charge-discharge period in which discharged electric power is larger than charged electric power, using the information regarding insufficiency of charged electric power, and, in a case where a charge-discharge period in which discharged electric power is larger than charged electric power is detected a number of times greater than or equal to a predetermined threshold value, detects charge insufficiency of the power storage device.

With this configuration, it is possible to properly detect charge insufficiency of a power storage device, according to the number of charge periods in which charged electric power is insufficient.

Furthermore, the wireless power supply management apparatus of the present invention is such that the detecting portion acquires, for each of one or more charge-discharge periods, a difference between electric power charged in a charge period and electric power discharged in a discharge period, as information regarding insufficiency of electric power charged in the charge period, and, in a case where a value obtained by integrating differences in the electric power acquired for the charge-discharge periods exceeds a predetermined threshold value, detects charge insufficiency of the power storage device.

With this configuration, it is possible to properly detect charge insufficiency of a power storage device, according to the amount of insufficiency of electric power charged in a charge period.

Furthermore, the wireless power supply management apparatus of the present invention is such that the wireless power supply system includes a power supply target that receives supply of electric power from the power storage device and operates in a normal operation mode and a power-saving mode in which consumption of electric power is saved, the power storage device supplies electric power to the power supply target, and the output portion outputs an instruction to operate in the power-saving mode, as the output according to a result of the detection by the detecting portion.

With this configuration, it is possible to operate a power supply target in a power-saving mode, in response to charge insufficiency of a power storage device, and to mitigate the charge amount insufficient state by suppressing the discharge amount of the power supply target.

Furthermore, the wireless power supply management apparatus of the present invention is such that the wireless power supply system includes a power transmission apparatus that wirelessly transmits electric power, and the output portion outputs an instruction to increase a current that is supplied from the power transmission apparatus in a charge period, as the output according to a result of the detection by the detecting portion.

With this configuration, it is possible to mitigate the charge amount insufficient state of a power supply target, by increasing current that is transmitted from a power transmission apparatus in response to charge insufficiency of a power storage device, and increasing electric power that is charged in a charge period.

According to the wireless power supply management apparatus and the like of the present invention, it is possible to properly detect and output charge insufficiency of a power storage device.

BRIEF DESCRIPTION OF THE DRAWINGS

FIG. 4 is a charge management table of the wireless power supply management apparatus in the embodiment.

FIG. 5 is a discharge management table of the wireless power supply management apparatus in the embodiment.

DETAILED DESCRIPTION OF THE INVENTION

Figure 1:
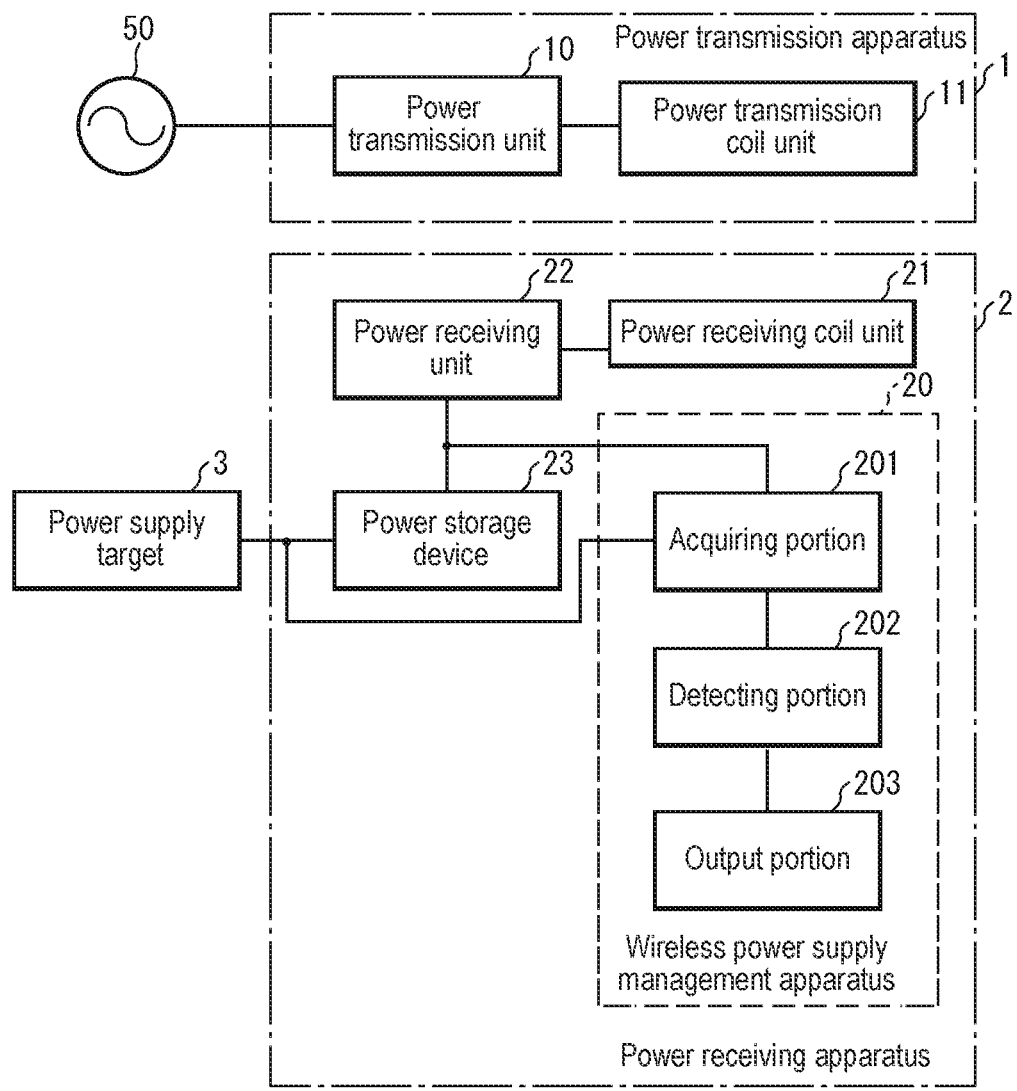
FIG. 1 is a block diagram of a wireless power supply system including a wireless power supply management apparatus according to an embodiment of the present invention.

Hereinafter, an embodiment of a wireless power supply management apparatus and the like will be described with reference to the drawings. It should be noted that constituent elements denoted by the same reference numerals in the embodiment perform similar operations, and thus a description thereof may not be repeated.

Embodiment

FIG. 1 is a block diagram of a wireless power supply system 1000 in this embodiment.

The wireless power supply system 1000 includes a power transmission apparatus 1, a power receiving apparatus 2, and a power supply target 3. Hereinafter, a case will be described as an example in which the wireless power supply system 1000 includes one power transmission apparatus 1, but, in the present invention, multiple power transmission apparatuses 1 may be included. Furthermore, a case will be described as an example in which the wireless power supply system 1000 includes one power receiving apparatus 2 and one power supply target 3, but, in the present invention, multiple power receiving apparatuses 2 and multiple power supply targets 3 may be included. All of the multiple power supply targets 3 may be the same, or at least some of them may be different from each other.

The power transmission apparatus 1 includes a power transmission unit 10 and a power transmission coil unit 11.

The power receiving apparatus 2 includes a wireless power supply management apparatus 20, a power receiving coil unit 21, a power receiving unit 22, and a power storage device 23.

The wireless power supply management apparatus 20 includes an acquiring portion 201, a detecting portion 202, and an output portion 203.

The wireless power supply system 1000 is a system that performs wireless power supply. The wireless power supply system 1000 is a system that repeatedly performs charge to the power storage device 23 and discharge from the power storage device 23 one or at least two times, by performing wireless power supply. The wireless power supply is also referred to as non-contact power transmission, wireless power transmission, or the like. There is no limitation on the wireless power supply method of the wireless power supply system 1000, and it may be the magnetic field resonant coupling method, may be the electromagnetic induction method, or may be other methods.

The power transmission apparatus 1 is an apparatus that transmits electric power to the power receiving apparatus 2 through wireless power supply. The power receiving apparatus 2 is an apparatus that receives electric power transmitted from the power transmission apparatus 1 through wireless power supply.

The power transmission unit 10 converts a current at a predetermined frequency such as a commercial frequency (e.g., 50/60 Hz) supplied from a power source 50 into a current at a high frequency (e.g., 85 kHz, etc.), and supplies it to the power transmission coil unit 11. For example, an inverter (not shown) and the like are mounted in the power transmission unit 10.

The power transmission coil unit 11 includes a coil (not shown), and receives a current at a high frequency supplied from the power transmission unit 10 and generates an alternating magnetic field.

The power receiving coil unit 21 of the power receiving apparatus 2 includes a coil (not shown), and receives a magnetic field generated by the power transmission coil unit 11, generates an alternating current at a high frequency, and supplies it to the power transmission unit 10.

The power receiving unit 22 converts a current at a high frequency supplied from the power receiving coil unit 21 into a direct current, through rectification and smoothing. The converted direct current is charged to the power storage device 23. The power receiving unit 22 includes, for example, a rectifier and smoothing circuit (not shown), and the like.

The power storage device 23 is a device in which electric power can be stored and from which electric power can be discharged, and is charged with a direct current converted by the power receiving unit 22. The power storage device 23 may be, for example, a capacitor such as an EDLC (electric double-layer capacitor) or a lithium-ion capacitor, or may be a battery such as a lead-acid battery or a lithium-ion battery. The power storage device 23 supplies electric power to the power supply target 3.

The power supply target 3 is a device, apparatus, or system that operates by receiving supply of electric power from the power storage device 23. There is no limitation on the type of the power supply target 3, and it may be, for example, an AGV (automatic guided vehicle), or may be a power tool or the like.

Typically, the power receiving apparatus 2 is mounted in the power supply target 3. There is no limitation on how the power receiving apparatus 2 is mounted in the power supply target 3. The power receiving apparatus 2 may be, for example, detachably attached to the power supply target 3.

In this embodiment, a case is described in which the power supply target 3 is included as part of the wireless power supply system 1000, but, in the present invention, the power supply target 3 may be considered not to be included in the wireless power supply system 1000 but to be provided outside the wireless power supply system 1000.

The wireless power supply management apparatus 20 is, for example, an apparatus for properly detecting charge insufficiency of the power storage device 23 through wireless power supply.

The acquiring portion 201 acquires charge information and discharge information, for each of one or at least two pairs of a charge period and a discharge period immediately before or immediately after the charge period. One charge period is, for example, a period in which charge is performed with electric power supplied from the power transmission apparatus 1 through wireless power supply. The charge may be considered, for example, as power supply for performing charge from the power receiving unit 22 to the power storage device 23. One discharge period is, for example, a period in which electric power stored in the power storage device 23 is discharged through power supply to the power supply target 3. The discharge may be considered, for example, as power supply from the power storage device 23 to the power supply target 3. Hereinafter, one pair of a charge period and a discharge period immediately before or immediately after the charge period is referred to as a charge-discharge period.

The charge information is information indicating electric power charged to the power storage device 23 through wireless power supply in one charge period. The charge information indicates, for example, charged electric power in one charge period. The charged electric power is electric power charged in one charge period. The electric power charged in a charge period may be considered as the amount of electric power charged in a charge period. The electric power charged to the power storage device 23 may be considered as the amount of electric power charged to the power storage device 23. The charged electric power is, for example, a value of the charged electric power.

The discharge information is, for example, information indicating electric power discharged from the power storage device 23 in one discharge period. The discharge information indicates, for example, discharged electric power in one discharge period. The discharged electric power is electric power discharged in one discharge period. The electric power discharged in a discharge period may be considered as the amount of electric power discharged in a discharge period. The discharged electric power is, for example, a value of the discharged electric power.

One charge-discharge period may include, for example, a period in which neither charge to the power storage device 23 nor discharge from the power storage device 23 is performed, between a charge period and a discharge period, in a charge period, or in a discharge period. Two or more charge-discharge periods typically have the same order as to whether a discharge period contained in each charge-discharge period is immediately before or immediately after a charge period contained in that charge-discharge period, or may have different orders.

Two or more charge-discharge periods in which the acquiring portion 201 acquires charge information and discharge information are typically periods that are successive over time, and are, for example, two or more successive and repeated charge-discharge periods. However, two or more charge-discharge periods in which the acquiring portion 201 acquires charge information and discharge information may not be periods that are successive over time, and, for example, one or more charge-discharge periods or the like in which the acquiring portion 201 does not acquire charge information and discharge information may be interposed between two or more pairs of a charge period and a discharge period. The state in which periods are successive over time may be a state in which two or more periods are continuous over time, or may be a state in which two or more periods appear in a successive order. In the latter case, a period or the like in which neither charge nor discharge is performed may be interposed between two or more charge-discharge periods that are successive over time in which the acquiring portion 201 acquires charge information and discharge information.

One discharge period is, for example, an operation period in which the power supply target 3 that operates over electric power supplied from the power storage device 23 performs one or at least two operations. The one or at least two operations may be predetermined one or at least two operations, or may be any operations. The operations may be considered as so-called tasks. The discharge period may be a period other than the charge period in cycles for performing a predetermined series of operations, processes, or the like, and may include a period in which the power supply target 3 does not consume electric power supplied from the power storage device 23 in predetermined cycles. A discharge period and a charge period may at least partially overlap each other, and, for example, a charge period may be included in a discharge period. A case in which a charge period is included in a discharge period is, for example, a case in which charge through wireless power supply is performed during an operation of the power supply target 3. If a charge period is completely included in a discharge period, for example, the time when the one discharge period is to be started may be set to any timing, and, for example, may be set to the same as the time when the charge period is started.

The length of one charge period is preferably the time, for example, set for charging the power storage device 23 through wireless power supply with electric power in an amount that matches the amount of electric power that is discharged from the power storage device 23 in a discharge period immediately before or immediately after that charge period. This time is, for example, a theoretical value or an estimate value that seems to be necessary to charge the power storage device 23 through wireless power supply with electric power in an amount that matches the amount of electric power that is discharged. This time is, for example, the time obtained through simulation, estimation, calculation, or the like. It may be considered that, even in the case where there is a difference within a predetermined range between the discharged electric power and the charged electric power, they have amounts that match each other. The difference within a predetermined range is, for example, a difference within a margin of error, or a difference within an allowable range.

The length of a charge period and the length of a discharge period may be predetermined lengths, or may be lengths that can be dynamically changed. For example, the length of one discharge period may be a length that is dynamically determined according to an operation status or the like of the power supply target 3 that operates in that discharge period (e.g., the operation time of the power supply target 3, or the load that is incurred on the power supply target 3). The length that is dynamically determined may be considered as a length that dynamically changes. The length of a charge period may be, for example, dynamically determined according to the work status, the power supply target, or the like of the power supply target 3 immediately therebefore, or may be dynamically determined according to a discharge period immediately therebefore. For example, the power receiving apparatus 2 may include a processing portion (not shown) or the like for determining this sort of lengths of a charge period and a discharge period.

The length of one charge period may not be set in terms of time, and, for example, a period with any length in which the power receiving apparatus 2 is at a position where it can receive wireless power supply from the power transmission apparatus 1 and receives power supply may be considered as a charge period. It is possible to start or end a charge period in response to an instruction accepted from a user.

There is no limitation on how the acquiring portion 201 acquires discharge information of one discharge period. Hereinafter, the processing in which the acquiring portion 201 acquires discharged electric power as discharge information will be described by way of examples (A1) in which discharged electric power is acquired through measurement and (A2) in which discharged electric power is estimated.

(A1) Case in which Discharged Electric Power is Acquired Through Measurement

The acquiring portion 201 acquires discharged electric power, for example, through measurement. For example, the acquiring portion 201 may acquire discharged electric power by measuring the amount of electric power discharged in a discharge period. The configuration or processing for measuring the amount of electric power in one period is known in regard to so-called watthour meters and the like, and thus a description thereof has been omitted. The acquiring portion 201 may acquire discharged electric power, for example, by measuring electric power discharged in a discharge period and integrating the measured electric power. The measurement is performed, for example, once or more, and preferably multiple times over time, in one discharge period. The measurement of electric power may be considered as measurement of an instantaneous value of electric power, and the measured electric power may be considered as an instantaneous value of electric power during the measurement. The configuration or processing for measuring electric power is known in regard to so-called watthour meters and the like, and thus a description thereof has been omitted. The integration is a concept that encompasses accumulating measured electric power, accumulating the amount of electric power at measurement intervals acquired using measured one or at least two values of electric power, and the like. The same applies to the following integration. The processing for acquiring the amount of electric power in one period through integration from electric power measured over time in that one period is a known technique, and thus a detailed description thereof has been omitted. The acquiring portion 201 may acquire discharged electric power by measuring a current and a voltage of electric power supplied to the power supply target 3 in a discharge period, calculating one or more values of electric power that is discharged in a discharge period from the one or more measured values of the current and the voltage obtained through measurement, and integrating these values. The measurement of a current and a voltage may be considered as measurement of instantaneous values of a current and a voltage, and the measured current and voltage may be considered as instantaneous values of a voltage and a voltage during the measurement. For example, the acquiring portion 201 acquires discharged electric power, which is a value of electric power discharged in one discharge period, by measuring, multiple times over time, a current and a voltage of electric power supplied from the power storage device 23 to the power supply target 3 in one discharge period, calculating electric power using the measured current and voltage, and integrating the calculated multiple values of electric power in the one discharge period. The electric power can be acquired, for example, by calculating a product of the measured current and voltage. The measurement performed multiple times over time is preferably performed at predetermined equal time intervals, but may be performed at predetermined multiple relative times using, as a reference, the time when a discharge period is started. The measured electric power, the current and the voltage, the electric power during the measurement calculated from the measured current and voltage, and the like may be accumulated as appropriate in an unshown storage portion or the like. The integration of electric power is typically performed after a discharge period is ended.

(A2) Case in which Discharged Electric Power is Estimated

The acquiring portion 201 acquires discharged electric power by estimating electric power in a discharge period. For example, if discharged electric power per unit time in a discharge period is predetermined, discharged electric power is estimated by calculating discharged electric power in one discharge period using the length of one discharge period and the predetermined discharged electric power per unit time. The discharged electric power per unit time may be considered as electric power consumed by the power supply target 3 per unit time. For example, the acquiring portion 201 acquires, as estimated discharged electric power, a product of the number of unit times contained in a discharge period and the discharged electric power per unit time stored in an unshown storage portion or the like. The known discharged electric power per unit time may be discharged electric power per unit time acquired using experimental or previous measured values or the like, or discharged electric power per unit time (e.g., a value obtained by performing specific statistical processing such as an average value, etc.) calculated from discharged electric power in a discharge period, or may be discharged electric power per unit time calculated through simulation or the like. The same applies to discharged electric power per unit time described later.

Furthermore, the acquiring portion 201 may acquire discharged electric power according to processing that is performed by the power supply target 3, as estimated discharged electric power. For example, if the power supply target 3 is an AGV, the discharged electric power according to processing may be discharged electric power according to the number of carrying targets that are to be carried by the AGV, or may be discharged electric power according to the type of carrying targets. For example, a processing portion (not shown) or the like included in the power supply target 3 or the like may acquire information (e.g., a processing identifier, etc.) indicating processing that is performed by the power supply target 3, and output it to the wireless power supply management apparatus 20, and the acquiring portion 201 may acquire discharged electric power according to the information indicating the processing, as estimated discharged electric power, from a storage portion (not shown). The acquiring portion 201 may acquire discharged electric power per unit time according to the received information indicating the processing from storage portion (not shown) or the like, and acquire estimated discharged electric power as described above using the discharged electric power per unit time.

There is no limitation on how the acquiring portion 201 acquires charge information of one charge period. Hereinafter, the processing in which the acquiring portion 201 acquires charged electric power as charge information will be described by way of examples (B1) in which charged electric power is acquired through measurement and (B2) in which charged electric power is estimated.

(B1) Case in which Charged Electric Power is Acquired Through Measurement

The acquiring portion 201 acquires charged electric power, for example, through measurement. For example, the acquiring portion 201 may acquire charged electric power by measuring the amount of electric power charged by the power receiving unit 22 to the power storage device 23 in a charge period, may acquire charged electric power by measuring electric power charged in a charge period and integrating the measured one or at least two values of electric power, or may acquire charged electric power by measuring a current and a voltage of electric power charged by the power receiving unit 22 to the power storage device 23 in one charge period, calculating one or more values of electric power that is charged in a charge period from the one or more measured values of the current and the voltage, and integrating these values. This processing is similar to the processing for acquiring discharged electric power through measurement, and thus a description thereof has been omitted.

(B2) Case in which Charged Electric Power is Estimated

The acquiring portion 201 acquires charged electric power by estimating electric power in a charge period. For example, the acquiring portion 201 may estimate charged electric power according to the length of a charge period. For example, if charged electric power charged per unit time in a charge period is predetermined, charged electric power is estimated by calculating charged electric power charged in the charge period using the length of a charge period and the predetermined charged electric power per unit time. For example, if a current that is supplied by the power receiving unit 22 to the power storage device 23 in one charge period is constant, the acquiring portion 201 estimates charged electric power in a charge period by measuring a voltage applied from the power receiving unit 22 to the power storage device 23 in one charge period. For example, the acquiring portion 201 acquires estimated charged electric power by measuring, over time, a current and a voltage of electric power charged by the power receiving unit 22 to the power storage device 23 in one charge period, calculating electric power at the measurement times from values of a voltage measured over time and a current of electric power supplied in the charge period, and integrating the calculated multiple values of electric power. This processing is similar to the processing for estimating discharged electric power, and thus a description thereof has been omitted.

The acquiring portion 201 acquires, for example, discharge information of one discharge period, when or after the one discharge period is ended. The acquiring portion 201 acquires, for example, charge information of one charge period, when or after the charge period is ended.

The configuration of the acquiring portion 201 for measuring the charged electric power and the discharged electric power is realized, for example, by hardware (e.g., a dedicated circuit, etc.).

The detecting portion 202 acquires, for one or more charge periods, information regarding insufficiency of electric power charged in each charge period, and detects charge insufficiency of the power storage device 23 using the acquired information. The charge insufficiency of the power storage device 23 may be, for example, a state in which electric power stored in the power storage device 23 has been decreased due to repeated charge and discharge in one or more charge-discharge periods, or may be a state in which supply of electric power for operating the power supply target 3 may not be able to be performed if the electric power further decreases.

The insufficiency of electric power charged in one charge period is, for example, a state in which electric power charged in one charge period is insufficient with respect to electric power discharged in a discharge period immediately before or immediately after the one charge period. For example, the insufficiency of electric power charged in one charge period refers to a state in which the amount of electric power discharged in one discharge period immediately before or immediately after the charge period is larger than the amount of electric power charged in the one charge period. The amount of electric power discharged being larger is, for example, a state in which a value obtained by subtracting charged electric power from discharged electric power is positive. Note that the amount of electric power discharged being larger may be considered as a state in which the amount of discharged electric power is larger than electric power charged, at least by a threshold value predetermined based on a margin of error, a value that seems not to be problematic in practice, or the like.

The information regarding insufficiency of electric power charged in one charge period is, for example, information indicating whether or not electric power charged in one charge period is insufficient. The information regarding insufficiency of electric power charged in one charge period may be, for example, information indicating a result of a comparison between electric power charged in one charge period and electric power discharged in a discharge period immediately before or immediately after the charge period (e.g., a result of a comparison between the amounts of electric power). The information regarding insufficiency of electric power charged in one charge period may be, for example, information indicating the amount of insufficiency of electric power charged in one charge period. For example, the information regarding insufficiency of electric power charged in one charge period may be information indicating a difference between electric power charged in one charge period and electric power discharged in a discharge period immediately before or immediately after the charge period. The difference of the electric power being negative may be considered as a state in which charged electric power is excessive with respect to discharged electric power.

The insufficiency of electric power charged in one charge period may be considered as a decrease of electric power stored in the power storage device 23 in one charge-discharge period, and the information regarding insufficiency of electric power charged in one charge period may be information indicating whether or not electric power stored in the power storage device 23 has been decreased in one charge-discharge period, or may be information indicating the amount of decrease in the electric power.

The detecting portion 202 acquires information regarding insufficiency of electric power charged in each charge period contained in the one or more charge-discharge periods, for example, using the charge information and the discharge information acquired by the acquiring portion 201 for each of the one or more charge-discharge periods. For example, the detecting portion 202 acquires information regarding insufficiency of electric power charged in one charge period constituting one charge-discharge period, using charged electric power that is charge information and discharged electric power that is discharge information acquired for the one charge-discharge period.

Hereinafter, an example of processing of the detecting portion 202 will be described in the case where the detecting portion 202 acquires information indicating a result of the determination as to whether or not electric power discharged by the power storage device 23 in each of two or more charge-discharge periods is larger than electric power charged to the power storage device 23 in the same charge-discharge period, as information regarding insufficiency of electric power charged in the charge period, and detects charge insufficiency of the power storage device 23, using the information regarding insufficiency of electric power.

The detecting portion 202 determines, for example, whether or not discharged electric power that is electric power discharged by the power storage device 23 in one charge-discharge period is larger than charged electric power that is electric power charged to the power storage device 23, and acquires information indicating a result of the determination, as information regarding insufficiency of electric power charged in the charge period. The determination result indicating that discharged electric power is larger than charged electric power may be considered as information indicating that electric power charged in a charge period is insufficient with respect to electric power discharged in a discharge period of the same charge-discharge period. Whether or not discharged electric power is larger than charged electric power may be determined, for example, according to whether or not a difference of discharged electric power with respect to charged electric power (i.e., a value obtained by subtracting charged electric power from discharged electric power) is larger than a predetermined threshold value, or may be determined simply based on the size of values without using a threshold value. Hereinafter, this threshold value will be referred to as a threshold value for electric power comparison. For example, if the difference is larger than the threshold value for electric power comparison, it may be determined that the discharged electric power is larger than the charged electric power. The threshold value for electric power comparison is a value of 0 or more. The threshold value for electric power comparison is set to, for example, a value that seems to be within a margin of error or a value that seems not to be problematic in practice of the wireless power supply system 1000. The being problematic in practice is, for example, a state in which electric power will be insufficient if charge and discharge are further repeated without any countermeasure. The same applies to the description below.

The detecting portion 202 detects charge insufficiency of the power storage device 23, using information indicating whether or not discharged electric power is larger than charged electric power, acquired for each of the two or more charge-discharge periods as described above. For example, the detecting portion 202 detects a charge-discharge period in which discharged electric power is larger than charged electric power, using the acquired information, and, if a charge-discharge period discharged electric power is determined to be larger than charged electric power is detected a number of times greater than or equal to a predetermined threshold value, detects charge insufficiency of the power storage device 23. Hereinafter, this threshold value will be referred to as a threshold value for charge detection. The threshold value for charge detection is, for example, a value of 2 or more. The threshold value for charge detection is set to, for example, a value at which charge insufficiency that seems not to be a temporary change or the like or charge insufficiency that seems to be problematic in practice can be detected. A charge-discharge period in which discharged electric power is larger than charged electric power may be considered as a charge-discharge period in which charged electric power is insufficient. The detecting portion 202 may not detect power insufficiency of the power storage device 23 until charge-discharge period is detected a number of times greater than or equal to the threshold value for charge detection.

The processing in which the detecting portion 202 determines, for each of the two or more charge-discharge periods, whether or not electric power discharged by the power storage device 23 is larger than electric power charged to the power storage device 23 and acquires information indicating a result of the determination is typically performed following the order in which the charge-discharge periods appear. The processing in which the detecting portion 202 detects charge insufficiency of the power storage device 23 is preferably performed each time a charge-discharge period in which discharged electric power is larger than charged electric power is detected. For example, if the acquiring portion 201 acquires charged electric power and discharged electric power for a new charge-discharge period, the detecting portion 202 acquires, for this charge-discharge period, information regarding insufficiency of electric power charged in the charge period, determines for this charge period whether or not discharged electric power is larger than charged electric power, and, if the discharged electric power is larger, adds one to the number of charge-discharge periods in which discharged electric power is determined to be larger than charged electric power, and determines whether or not the number of charge-discharge periods in which discharged electric power is determined to be larger than charged electric power is greater than or equal to the threshold value for charge detection, thereby detecting charge insufficiency of the power storage device 23. The processing on charge-discharge periods is preferably performed on successive charge-discharge periods.

In the description above, as an example of processing of the detecting portion 202, a case was described in which information indicating a result of the determination as to whether or not discharged electric power is larger than electric power charged to the power storage device 23 is used as information regarding insufficiency of electric power charged in the charge period, but, in the description below, an example will be described in which the detecting portion 202 detects charge insufficiency of the power storage device 23, using a difference between electric power charged in a charge period and electric power discharged in a discharge period in one charge-discharge period, as information regarding insufficiency of electric power charged in the charge period.

The detecting portion 202 calculates, for example, for each of one or more charge-discharge periods, a difference between electric power charged in a charge period and electric power discharged in a discharge period, and acquires it as information regarding insufficiency of electric power charged in the charge period. The difference between electric power charged in a charge period and electric power discharged in a discharge period is, for example, a value of electric power obtained by subtracting electric power charged in a charge period from electric power discharged in a discharge period, and, if the electric power discharged in a discharge period is larger, that is, if the charged electric power is insufficient, the value is positive.

The detecting portion 202 integrates the difference between electric power charged in a charge period and electric power discharged in a discharge period acquired for each of one or more charge-discharge periods, and, if a value obtained through the integration exceeds a predetermined threshold value, detects charge insufficiency of the power storage device 23. Hereinafter, this threshold value will be referred to as an integration threshold value. The integration threshold value is a threshold value set for detecting charge insufficiency that seems not to be within a margin of error or charge insufficiency that is determined as being problematic in practice. If a difference between electric power charged in a charge period and electric power discharged in a discharge period is a value of electric power obtained by subtracting electric power charged in a charge period from electric power discharged in a discharge period, the integration threshold value is set to a value of 0 or more, and the exceeding the integration threshold value is a state in which the value is larger than the integration threshold value. If a difference between electric power charged in a charge period and electric power discharged in a discharge period is a value of electric power obtained by subtracting electric power discharged in a discharge period from electric power charged in a charge period, the integration threshold value is set to 0 or less, and the exceeding the integration threshold value is a state in which the value is smaller than the integration threshold value. The detecting portion 202 may integrate only a difference between a discharged electric power and a charged electric power in a charge-discharge period in which discharged electric power is higher than charged electric power, or may integrate a difference between a discharged electric power and a charged electric power in a charge-discharge period regardless of whether or not discharged electric power is higher than charged electric power (e.g., without performing determination as to whether or not discharged electric power is higher).

The processing in which the detecting portion 202 acquires a difference between discharged electric power and charged electric power in this example is preferably performed following the order in which the two or more charge-discharge periods appear as in the description above. The difference between discharged electric power and charged electric power acquired for the first one charge-discharge period may be considered as an integrated value of a difference between discharged electric power and charged electric power. The integration of a difference between discharged electric power and charged electric power and the detection of charge insufficiency of the power storage device using the integration threshold value are preferably performed each time the detecting portion 202 acquires a difference between discharged electric power and charged electric power of one charge-discharge period.

There is no limitation on a time, a trigger, or the like for the detecting portion 202 to acquire information regarding insufficiency of electric power charged in a charge period or to detect charge insufficiency of the power storage device 23. It is sufficient that, before the detecting portion 202 performs this sort of processing, the acquiring portion 201 acquires charge information and discharge information of one or more charge-discharge periods used in the processing. The charge information and the discharge information of charge-discharge periods are charge information and discharge information of a charge period and a discharge period constituting the charge-discharge periods. For example, when or after one charge-discharge period is ended, the acquiring portion 201 acquires charge information and discharge information of this charge-discharge period, and the detecting portion 202 performs processing for acquiring information regarding insufficiency of electric power charged in the charge period and processing for detecting charge insufficiency of the power storage device 23, using the charge information and the discharge information acquired by the acquiring portion 201. For example, it is preferable that, when or immediately after one charge-discharge period is ended, the acquiring portion 201 acquires charge information and discharge information of this charge-discharge period, and, immediately thereafter, the detecting portion 202 performs processing for acquiring information regarding insufficiency of electric power charged in the charge period, and the like.

In this embodiment, it is preferable that the above-described acquiring portion 201 acquires charge information and discharge information of a charge-discharge period constituted by a discharge period and a charge period immediately therebefore, and the detecting portion 202 performs processing for acquiring information regarding insufficiency of electric power charged in the charge period immediately before and processing for detecting charge insufficiency of the power storage device 23, before a next charge period of the charge period for which the acquiring portion 201 has acquired the charge information is started. For example, before one charge period is started, the acquiring portion 201 acquires discharge information and charge information of a discharge period and a charge period immediately therebefore, and, before this one charge period is started, the detecting portion 202 performs processing for acquiring information regarding insufficiency of electric power charged in the charge period immediately therebefore and processing for detecting charge insufficiency of the power storage device 23 using the acquired information, using the discharge information and the charge information acquired by the acquiring portion 201. If the processing can be performed at sufficiently high speed, when one charge period is started, the detecting portion 202 may perform processing for acquiring information regarding insufficiency of electric power charged in a charge period immediately before and processing for detecting charge insufficiency of the power storage device 23 using the acquired information. With this processing, charge insufficiency can be detected before one charge period is started, and, for example, if an instruction to increase electric power that is to be charged in this one charge period or the like is output to the power transmission apparatus 1 according to the detection result, the charge insufficiency can be solved through the charge in the one charge period. If an instruction to replace the power storage device 23 is output, unnecessary charge immediately thereafter can be prevented.

If a period in which neither charge nor discharge is performed is interposed after one charge period is ended and before a next discharge period is started, the acquiring charge information of the one charge period during this period may be considered as acquiring charge information when the one charge period is ended. In this case, it may be considered as acquiring charge information of the charge period immediately before, when the one discharge period is started. The same applies to, in the case where a period in which neither charge nor discharge is performed is interposed after a discharge period is ended and before a next charge period is started, the case of acquiring discharge information when the discharge period is ended, the case of acquiring discharge information of the discharge period immediately before, when the charge period is started, and the like.

The detecting portion 202 may detect charge insufficiency of the power storage device 23, using information regarding insufficiency of electric power charged in one or more charge periods, other than the information described in the examples above. The detecting portion 202 may detect charge insufficiency of the power storage device 23, using information regarding insufficiency of electric power charged in a charge period acquired for one or more charge-discharge periods, through processing other than that described in the examples above.

The output portion 203 performs output according to a result of the detection by the detecting portion 202. The output portion 203 performs, for example, output according to a result of the detection regarding charge insufficiency by the detecting portion 202. The output is a concept that encompasses display on a display device such as a monitor, turning on a lamp or the like, projection using a projector, printing by a printer, output of a sound, transmission of information or the like to one or more apparatuses inside the wireless power supply system 1000 or apparatuses outside the wireless power supply system 1000, accumulation of information or the like in a storage medium, delivery of a processing result to another processing apparatus or another program, and the like. The output portion 203 may include an output device (not shown) or the like necessary for output, and the output device may be provided outside the output portion 203.

For example, the output portion 203 outputs warning, as the output according to a result of the detection by the detecting portion 202. For example, if a result of the detection by the detecting portion 202 indicates charge insufficiency, the output portion 203 outputs warning, as the output according to a result of the detection by the detecting portion 202. The outputting warning is, for example, turning on an unshown warning lamp (not shown) included in at least one or more of the apparatuses included in the wireless power supply system 1000 (specifically, the power transmission apparatus 1, the power receiving apparatus 2, and the power supply target 3), outputting a warning image or message to a display screen (not shown) included in at least one or more of the apparatuses included in the wireless power supply system 1000, or outputting a warning sound or a warning message voice from a speaker (not shown) or the like included in at least one or more of the apparatuses included in the wireless power supply system 1000.

Furthermore, the outputting warning may be output as described above using a warning lamp, a display screen, a speaker (not shown), or the like installed at a location (e.g., in a plant, etc.) where the wireless power supply system 1000 is installed. In this case, the outputting warning by the output portion 203 can be performed through transmission using a wireless communication technology such as a wireless LAN or near field wireless communication of an instruction for outputting warning.

Furthermore, the outputting warning may be transmission of information indicating warning, a warning short message or mail, or the like to a server apparatus (not shown) for central administration of the wireless power supply system 1000 or the like, or a computer that is used by an administrator or the like of the wireless power supply system 1000. The transmission of such information, message or mail, or the like can be performed using a wireless communication technology as described above.

Furthermore, warning that is output by the output portion 203 may be an instruction to replace the power storage device 23. For example, the above-described warning lamp may be a lamp that provides an instruction to replace the power storage device 23, and the outputting warning may be turning on this lamp. The outputting warning may be displaying, on a monitor or the like, a message that provides an instruction to replace the power storage device 23. The warning sound or the like that is output by the output portion may be a sound that provides an instruction to replace the power storage device 23. The outputting warning may be a short message, mail, or the like that provides an instruction to replace the power storage device 23. The replacing instruction is a concept that encompasses information and the like for notifying that it is a time for replacement.

The warning that is output by the output portion 203 may contain an identifier of the power receiving apparatus 2 including the power storage device 23 for which charge insufficiency has been detected, an identifier of the power supply target 3 in which this power receiving apparatus 2 is mounted, or the like.

There is no limitation on the time for the output portion 203 to output warning. For example, the warning may be output at a time when the detecting portion 202 detects charge insufficiency of the power storage device 23, or at a predetermined time. The predetermined time is, for example, a time when a user or the like who is using the wireless power supply system 1000 can be notified of the warning. For example, the output portion 203 may output warning in a charge period after (preferably immediately after) the detecting portion 202 detects charge insufficiency of the power storage device 23. For example, if the destination and the like of the power supply target 3 are not constant, the destination and the like of the power receiving apparatus 2 mounted in the power supply target 3 are not constant either. However, even in the case where the destinations and the like are different, the power receiving apparatus 2 returns to a point near the power transmission coil unit 11 of the power transmission apparatus 1 at the time of charge, and thus it is considered that a user who is managing the power receiving apparatus 2 is deployed near the power transmission coil unit 11 at the time around the charge period. Accordingly, if warning is output in the charge period, the user can be notified of warning regarding charge insufficiency. The outputting warning at such a time is particularly preferable in the case where the warning is output from the power receiving apparatus 2 or the power supply target 3 (e.g., in the case where the outputting warning is turning on a lamp or the like included in the power receiving apparatus 2 or the power supply target 3).

If the power supply target 3 operates in a normal mode and a power-saving mode in which consumption of electric power is saved, and usually operates in the normal mode, the output portion 203 may output an instruction to operate the power supply target 3 in the power-saving mode, as the output according to a result of the detection by the detecting portion 202 (preferably, a detection result regarding charge insufficiency), to the power supply target 3 or a server apparatus (not shown) or the like for controlling the power supply target 3. The power-saving mode is a mode in which a device operates while saving consumption of electric power, and may be considered as an energy-saving mode. For example, in the case of an AGV and the like having a power-saving mode, it is possible to save consumption of electric power by suppressing sudden start, sudden acceleration, and the like, although the time necessary to perform one task becomes long. Thus, in the case where the power supply target 3 is such an AGV or the like, it is possible to suppress supply of electric power from the power storage device 23, thereby mitigating charge insufficiency, and allowing the power supply target 3 to operate with electric power that is supplied from the power storage device 23 until the power storage device 23 is replaced, by outputting an instruction to operate in the power-saving mode at the time of charge insufficiency.

Furthermore, the output portion 203 may further output an instruction to increase a current that is supplied from the power transmission apparatus 1 in a charge period through wireless power supply, as the output according to a result of the detection by the detecting portion 202 (preferably, a detection result regarding charge insufficiency). For example, the output portion 203 may transmit such an instruction to the power transmission apparatus 1 or a server apparatus (not shown) or the like for controlling the power transmission apparatus 1. The power transmission apparatus 1 increases a current that is supplied, for example, in response to such an instruction. The power transmission apparatus 1 increases a current that is supplied, for example, by a predetermined value. Note that the value of a current after an increase may be dynamically determined according to the type of power supply target or the like. With such an instruction, it is possible to increase a current at the time of wireless power supply, and to increase electric power that is charged per unit time in a charge period, thereby mitigating charge insufficiency, and allowing the power supply target 3 to operate with electric power that is supplied from the power storage device 23 until the power storage device 23 is replaced.

The output portion 203 may output two or more types of output among those described above, according to a result of the detection. The output portion 203 may perform output other than those described above, according to a result of the detection by the detecting portion 202.

Figure 2:
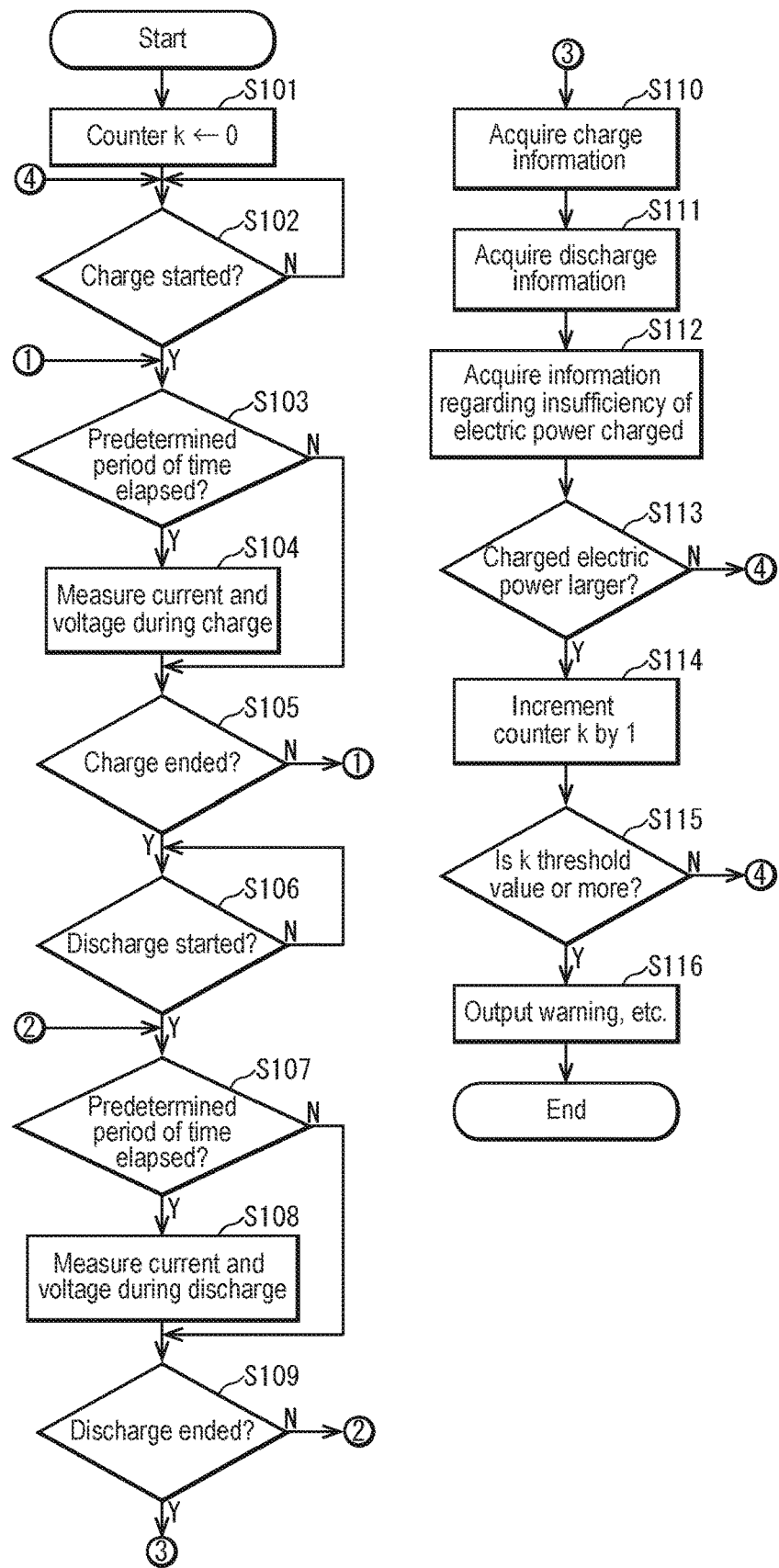
FIG. 2 is a flowchart illustrating an operation of the wireless power supply management apparatus in the embodiment.

Next, an example of an operation of the wireless power supply management apparatus 20 will be described with reference to the flowchart in FIG. 2. Hereinafter, a case will be described as an example in which one charge-discharge period is constituted by a charge period and a discharge period immediately thereafter, and the processing that the detecting portion 202 detects charge insufficiency of the power storage device 23 or the like is performed after each charge-discharge period is ended and before its next charge-discharge period is started.

(Step S101) The detecting portion 202 sets the value of a counter k to 0.

(Step S102) The acquiring portion 201 determines whether or not charge is started. If it is determined that charge is started, the procedure advances to step S103, and, if not, the procedure returns to step S102.

(Step S103) The acquiring portion 201 determines whether or not a predetermined period of time has elapsed after charge is started or after a current and a voltage of electric power output for charge immediately before are measured. If a predetermined period of time has elapsed, the procedure advances to step S104, and, if not, the procedure advances to step S105.

(Step S104) The acquiring portion 201 measures a current and a voltage of electric power output from the power receiving unit 22 to the power storage device 23 during charge. The measured value obtained by the measurement is accumulated in an unshown storage portion or the like in association with the measurement order.

(Step S105) The acquiring portion 201 determines whether or not the charge is ended. If the charge is ended, the procedure advances to step S106, and, if not, the procedure returns to step S103. Note that the period from when it is determined in step S102 that charge is started to when it is determined in step S105 that the charge is ended in this example is a charge period.

(Step S106) The acquiring portion 201 determines whether or not discharge is started. If it is determined that discharge is started, the procedure advances to step S107, and, if not, the procedure returns to step S106.

(Step S107) The acquiring portion 201 determines whether or not a predetermined period of time has elapsed after discharge is started or after a current and a voltage of electric power output for discharge immediately before are measured. If a predetermined period of time has elapsed, the procedure advances to step S108, and, if not, the procedure advances to step S109.

(Step S108) The acquiring portion 201 measures a current and a voltage of electric power output from the power storage device 23 to the power supply target 3 during discharge. The measured value obtained by the measurement is accumulated in the unshown storage portion or the like in association with the measurement order.

(Step S109) The acquiring portion 201 determines whether or not the discharge is ended. If the discharge is ended, the procedure advances to step S110, and, if not, the procedure returns to step S107. Note that the period from when it is determined in step S106 that discharge is started to when it is determined in step S109 that the discharge is ended in this example is a discharge period.

(Step S110) The acquiring portion 201 acquires charge information, using the current and the voltage values measured in the charge period immediately before. In this case, as an example, the acquiring portion 201 reads a measured current and voltage from the unshown storage portion and obtains a product thereof in each predetermined period of time in the charge period immediately before, thereby acquiring a value of electric power charged in each predetermined period of time, and integrates the acquired values of electric power, thereby acquiring charged electric power charged in the charge period, as charge information.

(Step S111) The acquiring portion 201 acquires discharge information, using the current and the voltage values measured in the discharge period immediately before. In this case, as an example, the acquiring portion 201 reads a measured current and voltage from the unshown storage portion and obtains a product thereof in each predetermined period of time in the discharge period immediately before, and integrates the acquired values of electric power, thereby acquiring discharged electric power discharged in a discharge period, as discharge information.

(Step S112) The detecting portion 202 determines whether or not the electric power indicated by the discharge information acquired in step S111 is larger than the electric power indicated by the charge information acquired in step S119, and acquires information indicating a result of the determination, as information regarding insufficiency of electric power charged in the charge period. For example, the detecting portion 202 determines whether or not a value of electric power obtained by subtracting charged electric power that is the charge information acquired in step S110 from discharged electric power that is the discharge information acquired in step S111 is larger than a predetermined threshold value for electric power comparison, wherein, if the value of electric power is larger, the detecting portion 202 determines that the electric power indicated by the discharge information is large, and, if not, determines that the electric power indicated by the discharge information is not large, thereby acquiring information indicating the results of the determination.

(Step S113) The detecting portion 202 determines whether or not the information regarding insufficiency of electric power charged in the charge period acquired in step S112 is information indicating that electric power discharged in a discharge period is larger than electric power charged in a charge period, wherein, if the information is information indicating that electric power discharged in a discharge period is larger, the procedure advances to step S114, and, if not, the procedure returns to step S102. If the procedure returns to step S102, the measurement information obtained through the measurement in the charge period and the discharge period immediately before may be deleted from the unshown storage portion. The same applies to step S115, which will be described later.

(Step S114) The detecting portion 202 increments the value of the counter k by 1.

(Step S115) The detecting portion 202 determines whether or not the value of the counter k is greater than or equal to the threshold value. This threshold value is the above-described threshold value for charge detection. If the value of the counter k is greater than or equal to the threshold value, it is determined that charge insufficiency of the power storage device 23 has been detected, and the procedure advances to step S116, and, if not, the procedure returns to step S102.

(Step S116) The output portion 203 performs output according to the result of the detection regarding charge insufficiency. For example, the output portion 203 outputs one or more of warning such as an instruction to replace a battery, an instruction to operate in the power-saving mode, and an instruction to increase a current that is supplied in a charge period. Then, the procedure is ended. This output may be performed at a predetermined time.

Specific Example

Hereinafter, a specific operation of the wireless power supply system 1000 in this embodiment will be described by way of an example.

Figure 3A:
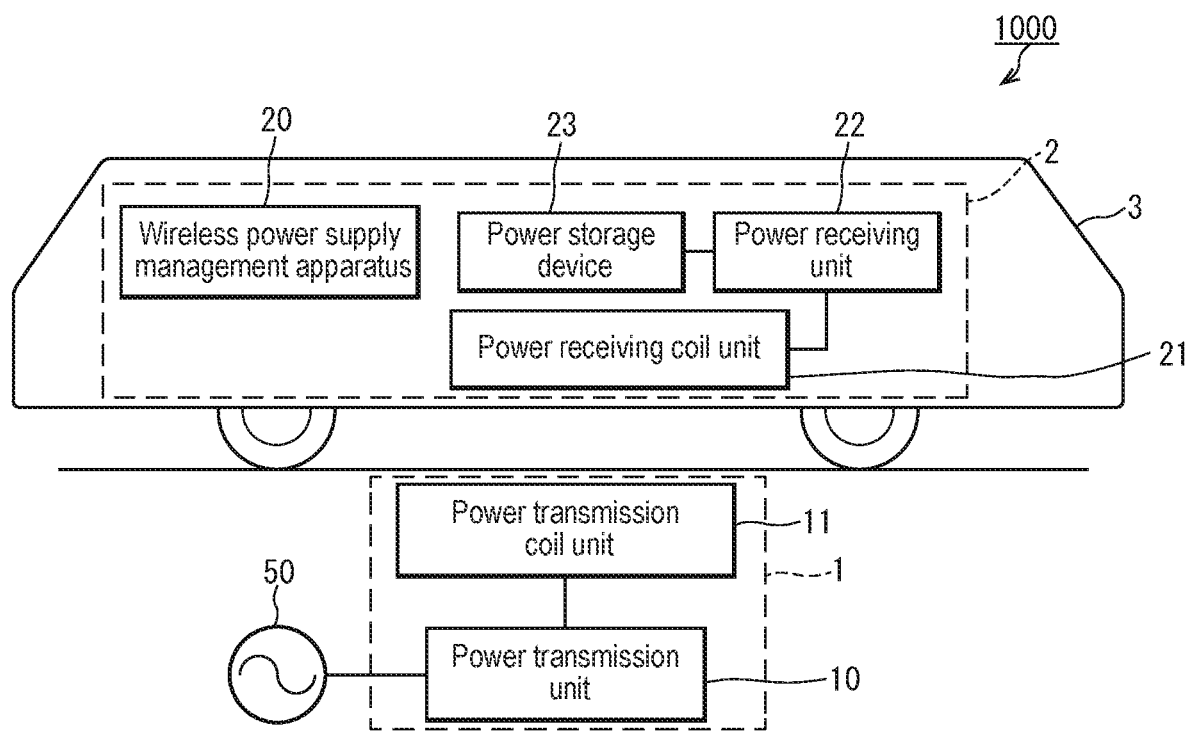
FIG. 3A is a schematic diagram of the wireless power supply system including the wireless power supply management apparatus in the embodiment.
Figure 3B:
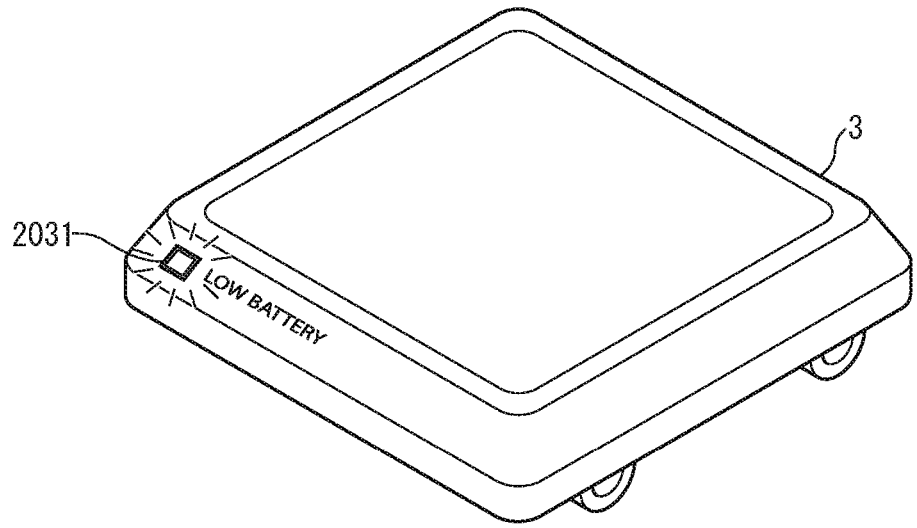
FIG. 3B is a perspective view of an example of a power supply target.

FIG. 3A is a schematic diagram of the wireless power supply system in this specific example, and FIG. 3B is a perspective view of an example of a power supply target.

Hereinafter, a case will be described as an example in which the wireless power supply system 1000 is a wireless power supply system used in an automatic guided system used in a plant or the like, the power supply target 3 included in the wireless power supply system 1000 is an AGV, and the power receiving apparatus 2 is mounted in the power supply target 3. Hereinafter, for the sake of ease of description, the power supply target 3 may be referred to as an AGV 3. Furthermore, although the case will be described in which the number of AGVs 3 is one, there may be multiple AGVs 3. Although the case will be described in which the AGV that is the power supply target 3 is included in the wireless power supply system 1000, the AGV that is the power supply target 3 may be considered not to be included in the wireless power supply system 1000. The power supply target 3 may not be an AGV, may be other self-propelled apparatuses or the like, or may be power tools or the like. The details of the configuration, the operation, and the like of the wireless power supply system 1000 including an AGV are known techniques, and thus a description thereof has been omitted.

It is assumed that the AGV 3 moves according to cycles for performing a series of predetermined operations or the like, and repeatedly performs one or more predetermined tasks and charge. In this example, a period in which one or more tasks are performed in one cycle is considered as a discharge period. It is assumed that the length of a discharge period and the length of a charge period in one cycle are determined in advance. The length of a charge period is set in advance to the length necessary to charge, through wireless power supply, electric power in an amount that matches the amount of electric power that is assumed to be discharged through one or more tasks in one cycle, that is, electric power in the power storage device 23 that is assumed to be discharged in a discharge period.

The AGV 3 performs the predetermined tasks and the like by automatically moving under control by an unshown control portion or the like. By a point in time immediately before a charge period, the AGV 3 moves to and stops at a point where it can receive electric power supplied from the power transmission coil unit 11 of the power transmission apparatus 1. After the AGV 3 has stopped, power supply is started, and charge is performed. After the power supply has been started, as described above, tasks and charge are repeatedly performed.

For example, when one charge period has been started, the acquiring portion 201 of the wireless power supply management apparatus 20 included in the power receiving apparatus 2 measures a current and a voltage of electric power charged from the power receiving unit 22 to the power storage device 23 each time a predetermined period of time elapses after the charge is started, and accumulates the measured value in an unshown storage portion in association with a time acquired from an unshown clock. The measurement and the accumulation are performed until the one charge period is completed.

FIG. 4 is a charge management table for managing a current and a voltage of electric power charged to the power storage device 23, acquired and accumulated by the acquiring portion 201 for one charge period. The charge management table has attributes "time", "current", and "voltage". "Time" indicates a time at which measurement is performed, "current" indicates a measured value of a current, and "voltage" indicates a measured value of a voltage. In this table, each record (row) is information measured at one point in time. It is assumed that attribute values $t_1$, $x_1$, $y_1$, and the like in the charge management table indicate any given value. The same applies to attribute values in a later-described discharge management table.

When a discharge period is started immediately after the one charge period, the acquiring portion 201 measures a current and a voltage of electric power supplied from the power storage device 23 to a power supply target, that is, a current and a voltage of electric power discharged from the power storage device 23, each time a predetermined period of time elapses after the discharge is started, and accumulates the measured value in an unshown storage portion in association with a time acquired from an unshown clock. The measurement and the accumulation are performed until the predetermined discharge period is completed.

FIG. 5 is a discharge management table for managing a current and a voltage of electric power discharged from the power storage device 23, acquired and accumulated by the acquiring portion 201 for a discharge period immediately after the one charge period in which the charge management table shown in FIG. 4 is acquired. The discharge management table is the same as the charge management table in FIG. 4, except that "current" indicates a measured value of a current of discharged electric power, and "voltage" indicates a measured value of a voltage of discharged electric power.

Next, when the discharge period is ended, the acquiring portion 201 acquires charged electric power that is charge information of the one charge period, using information of the charge management table shown in FIG. 4 stored in the unshown storage portion. The acquiring portion 201 acquires discharged electric power that is discharge information of the discharge period immediately after the one charge period, using information of the discharge management table shown in FIG. 5.

Specifically, the acquiring portion 201 calculates electric power charged at each measurement time, using attribute values of "current" and "voltage" in each record of the charge management table shown in FIG. 4. For example, a product of attribute values of "current" and "voltage" in each record is calculated, so that electric power charged at each measurement time is calculated. Then, the calculated values of electric power are integrated, so that charged electric power in the one charge period is acquired. In a similar manner, the acquiring portion 201 calculates electric power discharged at each measurement time, using attribute values of "current" and "voltage" in each record of the discharge management table shown in FIG. 5, and the calculated values of electric power are integrated, so that discharged electric power in the discharge period immediately after the one charge period is acquired.

The detecting portion 202 acquires information regarding insufficiency of electric power charged in the one charge period, using the charged electric power and the discharged electric power acquired by the acquiring portion 201. Specifically, the detecting portion 202 determines whether or not a value of discharged electric power acquired by the acquiring portion 201 for the discharge period immediately after the one charge period is larger than a value of charged electric power acquired for the one charge period immediately before the discharge period, and acquires information indicating a result of the determination, as information regarding insufficiency of electric power charged in the one charge period. This information regarding insufficiency may be considered as information regarding insufficiency of electric power charged in one charge period with respect to electric power discharged in a discharge period immediately thereafter.

If the thus acquired information indicating a result of the determination is information indicating that electric power discharged in the discharge period immediately after the one charge period is larger than electric power charged in the one charge period, the detecting portion 202 increments, by 1, the count value of the number of charge periods in which charged electric power is insufficient. The count value of the number of charge periods may be considered as the number of counts of charge-discharge periods containing the charge periods. The state in which electric power discharged in a discharge period is larger than electric power charged in a charge period may be considered as a state in which electric power charged in a charge period immediately before a discharge period that is to be started next is insufficient with respect to electric power discharged in the discharge period immediately thereafter. If the acquired information indicating a result of the determination is not information indicating that electric power discharged in a discharge period is larger than electric power charged in a charge period, the count value is not changed.

If the count value is incremented, the detecting portion 202 determines whether or not the incremented count value is greater than or equal to the predetermined threshold value for charge detection. If not, the detecting portion 202 does not detect charge insufficiency of the power storage device 23. The values stored in the above-described charge management table and discharge management table are deleted.

Then, the processing of charge and discharge is repeatedly performed as described above, the detecting portion 202 acquires information regarding insufficiency of electric power charged in a charge period as described above, and, if the acquired information indicates that electric power discharged in a discharge period is larger than electric power charged in a charge period, the count value of the number of charge periods in which charged electric power is insufficient is incremented by 1.

If the information regarding insufficiency of charged electric power, acquired by the detecting portion 202 when a discharge period is ended, is information indicating that electric power discharged in this discharge period is larger than electric power charged in a charge period immediately before, the detecting portion 202 increments, by 1, the count value of the number of charge periods in which charge insufficiency is detected. Then, if the count value becomes greater than or equal to the threshold value for charge detection, the detecting portion 202 detects charge insufficiency of the power storage device 23.

Since the detecting portion 202 detects charge insufficiency of the power storage device 23, the output portion 203 in this example turns on a lamp 2031 for indicating charge insufficiency, provided on the AGV 3, as shown in FIG. 3B as the output according to a result of this detection. Accordingly, an administrator or the like of the AGV 3 can be notified of the charge insufficiency.

As described above, according to this embodiment, it is possible to properly detect and output charge insufficiency of a power storage device, by acquiring, for one or more charge periods, information indicating the amount of insufficiency of electric power charged in each charge period, detecting charge insufficiency of the power storage device using the acquired information, and performing output according to a result of the detection. For example, even in a case where a power storage device is not charged to a fully charged state in each charge period, it is possible to properly detect and output charge insufficiency.

Modified Examples

Figure 6:
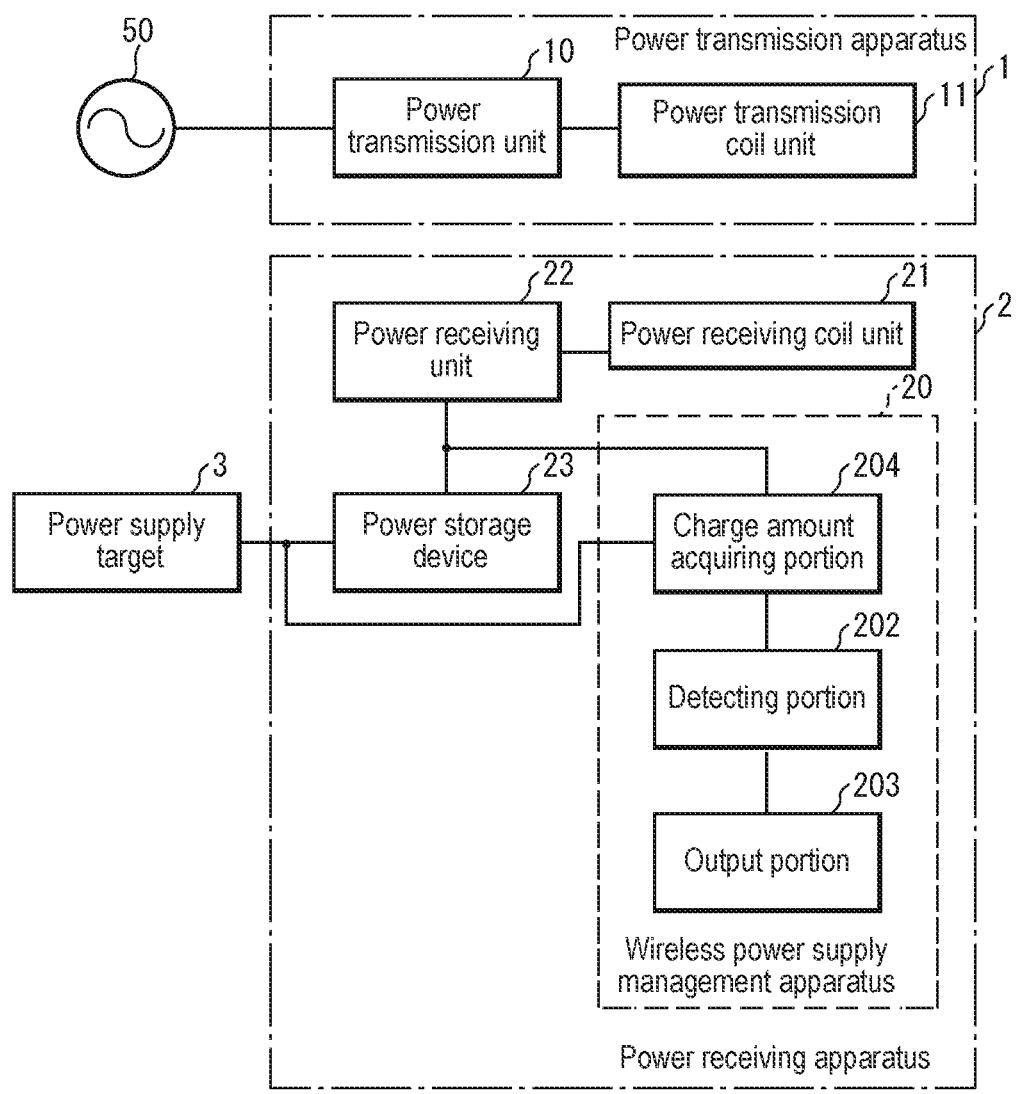
FIG. 6 is a block diagram of the wireless power supply system including the wireless power supply management apparatus according to a modified example of the embodiment of the present invention.

In the foregoing embodiment, an example was described in which charge information is acquired through processing in which the acquiring portion 201 measures an electric power, current and voltage, and the like charged to the power storage device 23, and discharge information is acquired through processing in which the acquiring portion 201 measures an electric power, current and voltage, and the like supplied from the power storage device 23 to the power supply target 3. However, as shown in FIG. 6, the wireless power supply management apparatus 20 may include a charge amount acquiring portion 204 that acquires one or more pieces of charge amount information instead of the acquiring portion 201, and the detecting portion 202 may acquire information regarding insufficiency of electric power charged in each charge period as in the foregoing embodiment using the charge amount information. Note that the charge amount acquiring portion 204 and the acquiring portion 201 may be used in combination.

The charge amount acquiring portion 204 acquires, for each of one or more charge periods, one or at least two pieces of charge amount information indicating electric power charged to the power storage device 23. The charge amount information is information indicating electric power charged to the power storage device 23, and is, for example, a value of charged electric power. The charge amount information may be considered as the remaining amount of electric power stored in the power storage device 23. The charge amount information of the power storage device 23 can be acquired, for example, by measuring an output voltage of the power storage device 23. Note that a value or the like of the output voltage of the power storage device 23 may be used as the charge amount information. A value obtained by expressing the remaining amount or the like of stored electric power in a proportion such as a percentage may be used as the charge amount information. The processing for acquiring charge amount information is a known technique, and thus a detailed description thereof has been omitted.

There is no limitation on a time or the like at which the charge amount acquiring portion 204 acquires charge amount information. One or more pieces of charge amount information acquired by the charge amount acquiring portion 204 for one charge period do not absolutely have to be charge amount information acquired in the one charge period. As the charge amount information for one charge period, the charge amount acquiring portion 204 may acquire, for example, charge amount information when a charge period immediately before the one charge period is ended and charge amount information when the one charge period is ended, or may acquire charge amount information when the one charge period is started and charge amount information when a charge period immediately thereafter is started. As the charge amount information for one charge period, the charge amount acquiring portion 204 may acquire, for example, charge amount information when a charge period immediately before the one charge period is ended, charge amount information when a discharge period immediately before the one charge period is ended, and charge amount information when the one charge period is ended, or may acquire charge amount information when the one charge period is started, charge amount information when the one charge period is ended, and charge amount information when a discharge period immediately after the one charge period is ended.

If the charge amount acquiring portion 204 is used as described above, the detecting portion 202 may acquire information regarding insufficiency of electric power charged in each of the one or more charge periods, using the one or more pieces of charge amount information acquired by the charge amount acquiring portion 204, and detect charge insufficiency of the power storage device 23.

For example, if the charge amount acquiring portion 204 acquires, as the charge amount information for one charge period as described above, charge amount information when a charge period immediately before the one charge period is ended and charge amount information when the one charge period is ended, the detecting portion 202 may acquire, for each of two or more charge periods, information indicating a result of a comparison between the value indicated by these pieces of charge amount information, as the information regarding insufficiency of charged electric power. Since a state in which the value of charge amount information when a charge period immediately before is ended is larger means that electric power charged in one charge period is insufficient, the detecting portion 202 may count the number of charge periods in which the value of charge amount information when a charge period immediately before is ended is larger, and, if the number of counts becomes greater than or equal to a threshold value, detect charge insufficiency of the power storage device 23. Also in the case of acquiring charge amount information when the one charge period is started and charge amount information when a charge period immediately thereafter is started as the charge amount information for the one charge period, in a similar manner, the number of charge periods in which the value of charge amount information when the one charge period is started is larger than that of charge amount information when a charge period immediately thereafter is started may be counted.

Furthermore, for example, if the charge amount acquiring portion 204 acquires, as the charge amount information for one charge period, charge amount information when a charge period immediately before the one charge period is ended, charge amount information when a discharge period immediately before the one charge period is ended, and charge amount information when the one charge period is ended, the detecting portion 202 may acquire, for each of the one or more charge periods, a value obtained by subtracting charge amount information when a discharge period immediately before the one charge period is ended from charge amount information when a charge period immediately before the charge period is ended, as discharged electric power discharged in the discharge period immediately before, acquire a value obtained by subtracting charge amount information when a discharge period immediately before the one charge period is ended from charge amount information when the one charge period is ended, as charged electric power charged in the one charge period, and perform the processing using the acquired discharged electric power and charged electric power as in the above-described case where the acquiring portion 201 acquires discharged electric power and charged electric power, thereby detecting charge insufficiency of the power storage device 23. For example, if the charge amount acquiring portion 204 acquires, as the charge amount information for one charge period, charge amount information when the one charge period is started, charge amount information when the one charge period is ended, and charge amount information when a discharge period immediately after the one charge period is ended, charged electric power may be acquired by subtracting charge amount information when the one charge period is started from charge amount information when the one charge period is ended, and discharged electric power may be acquired by subtracting charge amount information when a discharge period immediately after the one charge period is ended from charge amount information when the one charge period is ended.

The processing and the like by the output portion 203 are as in the foregoing embodiment, and thus a description thereof has been omitted.

In this manner, if charge amount information is used, measurement of a current and a voltage during charge and measurement of a current and a voltage during discharge are not necessary, and thus the processing can be simplified.

In the foregoing embodiment, the case was described as an example in which charged electric power is used as charge information. However, it is sufficient that the charge information used in the present invention is information substantially indicating electric power charged in one charge period, and information other than charged electric power also may be used. Also, in the foregoing embodiment, the case was described as an example in which discharged electric power is used as discharge information. However, it is sufficient that the discharge information used in the present invention is information substantially indicating electric power discharged in one discharge period, and information other than discharged electric power also may be used.

For example, if charge to the power storage device 23 is performed at a constant current, an integral value of a voltage during charge measured in one charge period may be used as the charge information. For example, if the charge is performed at a constant voltage, an integral value of a current during charge measured in one charge period may be used as the charge information. In this case, the acquiring portion 201 may measure a current or a voltage in a charge period used for the integration, multiple times over time. In a similar manner, for example, if discharge from the power storage device 23 is performed at a constant current, an integral value of a voltage during discharge measured in one discharge period may be used as the discharge information. If the discharge is performed at a constant voltage, an integral value of a current during discharge measured in one discharge period may be used as the discharge information. In this case, the acquiring portion 201 may measure a current or a voltage in a discharge period used for the integration, multiple times over time. In such a case, the detecting portion 202 may use an integral value of a current or a voltage during charge and an integral value of a current or a voltage during discharge as described above instead of charged electric power and discharged electric power. Note that the information used as the discharge information and the information used as the charge information are preferably information that can be subjected to comparison, and are more preferably the same type of information because comparison can be directly performed. The same type of information is, for example, values expressed in the same unit, for example.

In the foregoing embodiment, each process (each function) may be realized as centralized processing using a single apparatus (system), or may be realized as distributed processing using multiple apparatuses.

In this embodiment, the case was described as an example in which the wireless power supply management apparatus 20 is provided in the power receiving apparatus 2. However, the detecting portion 202 and the output portion 203 of the wireless power supply management apparatus 20 may be provided on the power transmission apparatus 1 side, and charge information, discharge information, and the like acquired by the acquiring portion 201 may be transmitted to the detecting portion 202 or the like of the power transmission apparatus 1. An apparatus (not shown) that measures a current or a voltage of electric power output from the power receiving unit 22 to the power storage device 23 in a charge period, an apparatus (not shown) that measures a current or a voltage of electric power output from the power storage device 23 to the power supply target 3 in a discharge period, and an apparatus (not shown) that transmits these measured values to the power transmission apparatus 1 may be provided in the power receiving apparatus 2, and the wireless power supply management apparatus 20 may be provided in the power transmission apparatus 1, so that the acquiring portion 201 accepts the measured values transmitted from the apparatus that is provided in the power receiving apparatus 2 and transmits measured values to the power transmission apparatus 1, thereby acquiring charge information and discharge information. In this case, the acquiring charge information and discharge information may be, for example, accepting measured values, or may be calculating charge information and discharge information using the accepted measured values, or the like.

Furthermore, in the foregoing embodiment, each constituent element may be configured by dedicated hardware, or, alternatively, constituent elements that can be realized by software may be realized by executing a program. For example, each constituent element may be realized by a program execution unit such as an MPU reading and executing a software program stored in a storage medium such as a hard disk or a semiconductor memory. At the time of executing the program, the program execution unit may execute the program while accessing a storage unit (e.g., a storage medium such as a hard disk or a memory).

The present invention is not limited to the embodiments set forth herein. Various modifications are possible within the scope of the invention.

As described above, the wireless power supply management apparatus according to the present invention is suitable as a wireless power supply management apparatus used for a wireless power supply system, and is useful in particular as an apparatus and the like for detecting and outputting charge insufficiency of a power storage device in a power receiving apparatus of a wireless power supply system.

What is claimed is:

1. A wireless power supply management apparatus used for a wireless power supply system including a power storage device, and configured to repeatedly charge and discharge the power storage device, comprising:
    a detector acquiring, for one or more charge periods, information regarding insufficiency of electric power charged in each charge period, and detecting a charge insufficiency of the power storage device using the acquired information;
    an output performing an output according to a result of the detection by the detector; and
    an acquiring portion that acquires, for each of one or more charge-discharge periods, each of which is a pair of a charge period and a discharge period immediately before or immediately after the charge period, charge information indicating electric power wirelessly charged to the power storage device in a charge period and discharge information indicating electric power discharged from the power storage device in a discharge period,
    wherein the detector acquires information regarding insufficiency of electric power charged in each charge period of the one or more charge-discharge periods, using the charge information and the discharge information acquired by the acquiring portion for each of the one or more charge-discharge periods.

2. The wireless power supply management apparatus according to claim 1, wherein the charge information indicates charged electric power that is electric power charged in a charge period, and the discharge information indicates discharged electric power that is electric power discharged in a discharge period.

3. The wireless power supply management apparatus according to claim 1, wherein the detector determines, for each of two or more charge-discharge periods, whether or not electric power discharged in a discharge period is larger than electric power charged in a charge period, acquires information indicating a result of the determination, as information regarding insufficiency of electric power charged in the charge period, detects a charge-discharge period in which discharged electric power is larger than charged electric power, using the information regarding insufficiency of charged electric power, and, in a case where a charge-discharge period in which discharged electric power is larger than charged electric power is detected a number of times greater than or equal to a predetermined threshold value, detects charge insufficiency of the power storage device.

4. The wireless power supply management apparatus according to claim 1, wherein the detector acquires, for each of one or more charge-discharge periods, a difference between electric power charged in a charge period and electric power discharged in a discharge period, as information regarding insufficiency of electric power charged in the charge period, and, in a case where a value obtained by integrating differences in the electric power acquired for the charge-discharge periods exceeds a predetermined threshold value, detects charge insufficiency of the power storage device.

5. The wireless power supply management apparatus according to claim 1,
    wherein the wireless power supply system comprises a power supply target that receives supply of electric power from the power storage device and operates in a normal operation mode and a power-saving mode in which consumption of electric power is saved,
    the power storage device supplies electric power to the power supply target, and
    the output outputs an instruction to operate in the power-saving mode, as the output according to a result of the detection by the detecting portion.

6. The wireless power supply management apparatus according to claim 1,
    wherein the wireless power supply system comprises a power transmission apparatus that wirelessly transmits electric power, and
    the output outputs an instruction to increase a current that is supplied from the power transmission apparatus in a charge period, as the output according to a result of the detection by the detector.

* * * * *